United States Patent
Ylitalo et al.

(10) Patent No.: US 7,861,295 B2
(45) Date of Patent: Dec. 28, 2010

(54) RISK DETECTION

(75) Inventors: Jouni Ylitalo, Oulu (FI); Jyrki V. Leskelä, Oulu (FI)

(73) Assignee: Nokia Corporation (FI)

( * ) Notice: Subject to any disclaimer, the term of this patent is extended or adjusted under 35 U.S.C. 154(b) by 1209 days.

(21) Appl. No.: 10/314,572

(22) Filed: Dec. 9, 2002

(65) Prior Publication Data

US 2003/0149897 A1    Aug. 7, 2003

(30) Foreign Application Priority Data

Dec. 11, 2001    (GB) .................................. 0129596.3

(51) Int. Cl.
*G06F 11/00* (2006.01)
(52) U.S. Cl. .......................... 726/22; 726/27; 455/410
(58) Field of Classification Search .................... 726/2, 726/3, 16, 17, 22–30, 32; 713/164–168, 713/187, 190; 380/270, 247; 455/410, 411, 455/419; 709/227, 229, 220–221; 711/170, 711/168; 718/100; 705/56–59, 50, 51
See application file for complete search history.

(56) References Cited

U.S. PATENT DOCUMENTS

| 5,379,343 | A |   | 1/1995 | Grube et al. | |
|---|---|---|---|---|---|
| 5,502,831 | A | * | 3/1996 | Grube et al. | 711/100 |
| 5,661,800 | A | * | 8/1997 | Nakashima et al. | 726/27 |
| 5,678,197 | A | * | 10/1997 | Grube et al. | 455/517 |
| 5,889,942 | A | * | 3/1999 | Orenshteyn | 726/3 |
| 5,974,549 | A | * | 10/1999 | Golan | 726/23 |
| 6,631,472 | B2 | * | 10/2003 | Kaplan et al. | 713/166 |
| 6,697,948 | B1 | * | 2/2004 | Rabin et al. | 726/30 |
| 6,842,861 | B1 | * | 1/2005 | Cox et al. | 713/188 |
| 6,920,634 | B1 | * | 7/2005 | Tudor | 718/107 |
| 6,931,545 | B1 | * | 8/2005 | Ta et al. | 713/156 |
| 6,944,792 | B2 | * | 9/2005 | Ju | 714/25 |
| 6,954,861 | B2 | * | 10/2005 | Watkins et al. | 705/56 |
| 6,971,015 | B1 | * | 11/2005 | Falcon et al. | 713/182 |
| 6,990,591 | B1 | * | 1/2006 | Pearson | 726/22 |
| 7,072,820 | B1 | * | 7/2006 | Bailey et al. | 703/17 |
| 2002/0138757 | A1 | * | 9/2002 | Lynn et al. | 713/201 |
| 2002/0147916 | A1 | * | 10/2002 | Strongin et al. | 713/193 |
| 2003/0009687 | A1 | * | 1/2003 | Ferchau et al. | 713/200 |
| 2003/0022657 | A1 | * | 1/2003 | Herschberg et al. | 455/414 |

FOREIGN PATENT DOCUMENTS

| EP | 0 965 917 A1 | 12/1999 |
|---|---|---|
| GB | 2 350 971 A | 12/2000 |
| WO | WO 98/58512 | 12/1998 |

* cited by examiner

*Primary Examiner*—Nirav Patel
(74) *Attorney, Agent, or Firm*—Mintz Levin Cohn Ferris Glovsky and Popeo, P.C.

(57) ABSTRACT

A method and device for detecting a condition in a communication system, including at least one user equipment, for determining at least one parameter associated with a communication link between an application and a node of said user equipment, and detecting the condition in response to the at least one parameter.

15 Claims, 4 Drawing Sheets

RISK DETECTION

BACKGROUND OF THE INVENTION

The present invention relates to a method and apparatus for identifying potential security risks. In particular, but not exclusively, the invention relates to the detection of a condition which indicates a security risk in user equipment of a communication system.

Various user equipment (UE), such as computers (fixed or portable), mobile telephones, personal data assistants (PDA's) or organizers and so on are known to the skilled person and these can be used to communicate with other user equipment in a communication system or to access the Internet to obtain services. Mobile user equipment is often referred to as a mobile station (MS) and can be defined as a means which is capable of communication via a wireless interface with another device such as a base station of a mobile telecommunication network or any other station. Such mobile user equipment can be adapted for voice, text message or data communication via the wireless interface.

As digital convergence reshapes the way businesses and users use and share information a merging of digital communication technology, digital media and computing is taking place. UE is being developed to enable users to access the facilities provided by such convergence.

So-called high-end mobile phones (or smartphones or communicators) are examples of MS which have been developed to fulfil this requirement. These include not only a cellular mobile telephony (CMT) interface which enables the MS to operate as a mobile phone but also include a personal data assistant (PDA) interface which enables a user to use the MS as a PDA.

A feature of some of these smartphones is that they provide the facility of installing or loading third party software into the MS. As is known such software can include malicious software in the guise of viruses, trojan horses or some other element introduced by a hacker in order to abuse the MS or to gain access to some facilities.

It is well known that Personal Computers (PC's) are susceptible to such problems and the solutions proposed in that field are manyfold and include detailed security measures to prevent, detect and/or respond to the security risks posed by such malicious software.

However the open operating systems of most of the hand-portable devices, such as the Symbian operating system (OS), which exist currently for MS do not provide a fine grained security model for overcoming the security risk. Furthermore various solutions which have been proposed are application level solutions which are software based. These can be bypassed by a sophisticated programmer.

The various security features in a MS can be categorized as:
1. prevention
2. detection
3. response Improving any one of these for the OS systems in a MS will help improve the security by reducing the security risk.

SUMMARY OF THE INVENTION

It is an aim of embodiments of the present invention to at least partly mitigate the above-referenced problems.

It is an aim of further embodiments of the present invention to improve the ability of a MS to detect direct misuse of the CMT processor services in the MS.

According to a first aspect of the present invention there is provided a method for detecting a condition in a communication system including at least one user equipment comprising the steps of: determining at least one parameter associated with a communication link between an application and a node of said user equipment; and detecting said condition in response to said at least one parameter.

According to a second aspect of the present invention there is provided a user equipment arranged to identify a condition in a communication system comprising: processor means for running an application; a node for providing access to a service; means for identifying at least one parameter associated with a communication link established between said processor means and said node; and means responsive to said identified parameter for detecting a condition.

Embodiments of the present invention provide the advantage that potential security risks are detected. Thereafter security measures may be taken to ensure the MS services are not misused.

Embodiments of the present invention also provide the advantage that the CMT processor services of the MS cannot be accessed by unauthorized functionality on the PDA processor side of the MS. This denial of access is controlled at a low level in the MS OS to which a third party has no access and can thus not engineer (or program) around.

Embodiments of the present invention are also applicable where the device/apparatus does not necessarily have two physical processors separate for the PDA and CMT functionalities, (although that is often the case). In these embodiments only one processor may be provided with two operating systems. Alternatively more than two processors may be used.

This denial of access is controlled at a low level in the MS OS to which a third party has no access and can thus not engineer (or program) around.

In embodiments of the present invention control and the necessary checks for security is done in the extension of the OS (for example via a device driver). In such embodiments the MS OS is adapted to include security software which can carry out the checks. The security software can reside in such an extension. In this way the security software that resides in the OS extension, is doing the check.

BRIEF DESCRIPTION OF THE DRAWINGS

In the drawings, like reference numerals refer to like parts.

Embodiments of the present invention will now be described hereinafter, by way of example only, with reference to the accompanying drawings in which.

DETAILED DESCRIPTION OF THE PRESENTLY PREFERRED EMBODIMENTS

Figure 1:
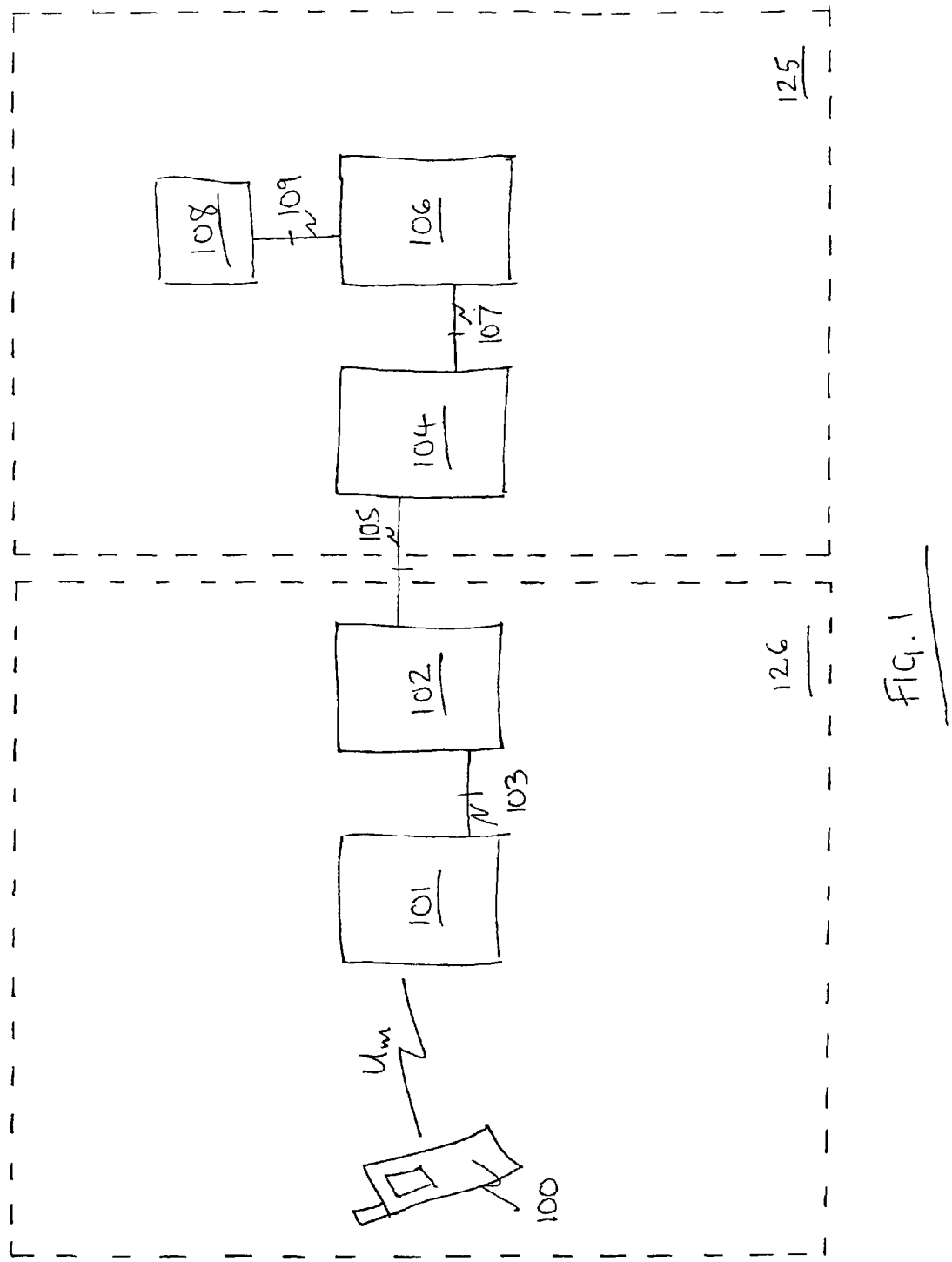
FIG. 1 illustrates a generic wireless communication system.

A general wireless communication system logical architecture is illustrated in FIG. 1. A mobile station (MS) 100 can be a mobile telephone or a laptop computer or smartphone or communicator which has a radio modem or a fax adapted for radio access. The term MS is used here as an example of mobile user equipment (UE). This communicates with the base transceiver station (BTS) 101 over the radio interface ($U_M$ Interface). The term BTS is used here also to cover the UMTS terrestrial radio access network (UTRAN) corresponding to the network element node B. The BTS is equipment for enabling transmission and reception of signals and may additionally include ciphering equipment. The BTS in turn communicates with a base station controller (BSC) 102 via link 103 (A Bis in GSM, Iub in UMTS). The term BSC is used here also to cover the UTRAN corresponding network element which is the radio network controller (RNC). The BSC sets up the radio channels for signalling and traffic to the core-network (CN) node 104 via link 105. This forms part of the core-network 125.

The CN node can be either a mobile switching centre (MSC) or serving GPRS support node (SGSN) depending on the switching domain (circuit switched or packet switched). The CN node 104 is a switching node having many functions. In particular, the CN node performs connection management, mobility management and authentication activities. In this example the CN node also contains the call control function and service switching functions defined by the IN/CAMEL architecture. However, in the package switched domain the before-mentioned CN node can control a number of BSC which are referred to as being in a CN node service area. In general BTS's and BSC's together form the radio access network (RAN) 126, which is referred to as the base station sub-system (BSS) in GSM and UTRAN in UMTS.

The CN node is connected to the gateway mobile location centre (GMLC) via the $L_g$ interface 107 which contains functionality required to support LCS. In one PLMN there may be more than one GMLC. The GMLC is the first node an external LCS client accesses in a GSM PLMN. In response to a location request from an LCS client, the GMLC may request routing information from the home location register (HLR) 108 of the system via the $L_h$ interface 109. The HLR is a database which allows a mobile subscriber to be permanently registered in the system. The HLR keeps track continuously of the location of a subscriber or MS i.e. via the Visitor Location Register (VLR) or SGSN. In addition to the HLR, each CN node 104 is associated with a database (not shown) containing details of subscribers temporarily in the service area of the CN node. In circuit switched domain this database is called Visitor Location Register (VLR), and in the packet switched domain the database is contained in the SGSN. It will be understood that other features exist in communication systems but these are not shown or described here for the sake of brevity.

It will be understood that the present is not restricted to use in GSM and/or UMTS only, rather it is equally applicable for other kind of wireless communication-systems such as, for example CDMA networks, connection to WLAN or Bluetooth networks.

Figure 2:
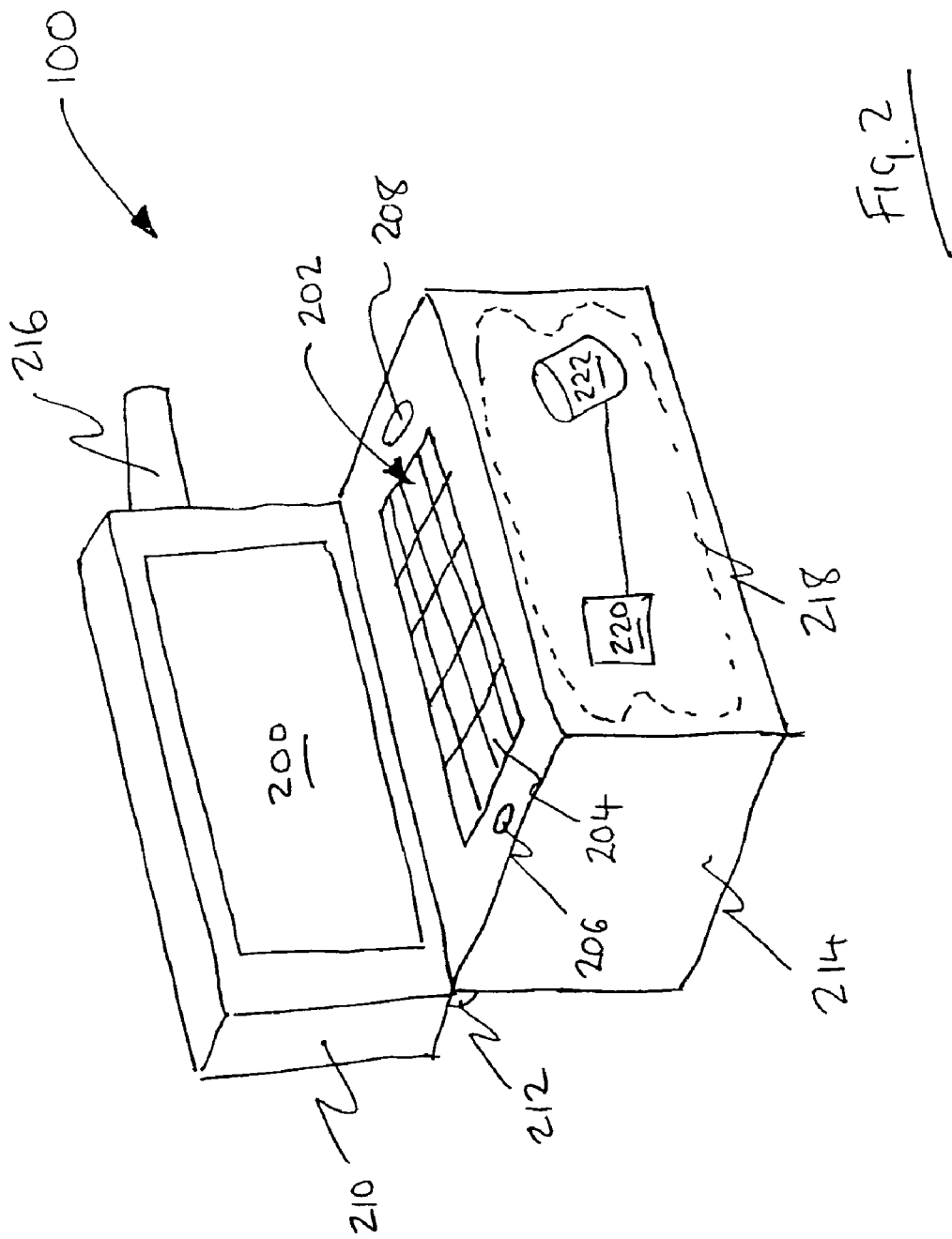
FIG. 2 illustrates a MS.

FIG. 2 illustrates mobile user equipment (100) which, in accordance with embodiments of the present invention, may be a high-end mobile phone such as a smartphone or communicator. Such mobile user equipment will be referred to hereinafter as a mobile station (MS). It will be understood that the present invention is not limited to any particular configuration of MS but rather is applicable to any MS which includes both telephony functionality, that is the ability to make telecommunications, and data processing functionality.

The data processing functionality maybe understood to broadly describe the facility of providing data manipulation facilities to a user of the MS. As an example these maybe thought of as the services which may typically be provided by personal data assistants (PDA). Such devices are designed to operate as note takers, organizers and to offer basic word processing and spreadsheet facilities. More and more of such facilities are being placed in MS and the invention is not limited to MS with any particular data manipulation functionality "on board".

The MS (100) includes a user interface which includes a display screen (200), keypad (202) made up of keys (204). Also included is a microphone (206) and earphone (208). A similar microphone and earphone (not shown) may be positioned on the outside of the lid (210). The lid (210) is hinged (212) to a base portion (214). A transceiver antenna (216) enables the MS (100) to communicate with a communication system over a wireless communication link $U_M$.

The MS (100) shown in FIG. 2 is shown cut away by dotted line (218) to reveal processing apparatus (220) and data storage apparatus (222). The MS (100) includes an operating system (OS) which manages the programs in the MS. These programs include systems software which consists of low-level programs which interact with a computer at a fairly basic level, (such as OS and compilers) and application software such as word processing, spreadsheet and other data manipulation processes.

One well known OS is the Symbian OS which has been adopted by many mobile phone manufacturers to create MS which combine voice communications, wireless internet access and computing functionality. It is well known that the kernel is the nucleus of such an OS. This is the core which provides basic services for all other parts of the OS. Typically the kernel includes an interrupt handler (which handles all requests or completed I/O operations that compete for the kernel services), a scheduler (which determines which programs share the kernels processing time and in what order), and a supervisor (which actually gives use of the computer to each process when it is scheduled). A kernel may also include a manager of the operating systems address spaces in memory of storage, sharing these among all components and other users of the kernel services.

The OS of the MS (100) thus provides a software platform on which application programmes can run. Such application programmes reside in the memory in the MS. In particular the application can be stored in the area of memory where applications can be placed only by the manufacturer or by some other trustworthy source. This may be in the read only memory (ROM) portion. Third party software, which may be installed when manufacturing the MS or later, will reside in another area of memory so they can thus be identified as possibly containing malicious software by comparing the respective memory addresses.

Each application programme located on the device/apparatus can be identified, by checking, as being located in the memory area where only the manufacturer can place applications.

In this way the MS can provide an open software platform which can enable client applications to access and utilise, amongst other functions, the telephony services of the MS.

This does not present a problem if all applications run via processors in the MS (100) are in built and thus the integrity is assured. However software may be downloaded either via a wireless link or via cable from a PC into the MS and hence from a third party. Such downloaded software may be malicious in the sense that it may include virus or a trojan horse or other feature introduced to have a deleterious effect. This problem is particularly pronounced when such malicious software can gain control or/and thus access to the cellular mobile telephony (CMT) interface of the MS from which the application can potentially make calls to other UE in the communication system. In order to prevent this the MS (100) is provided with functionality which prevents applications which might contain malicious software from accessing the telephony services. This may be done by assuring that only software whose integrity is assured can access the telephony side of the MS.

This is achieved by checking the memory area where an application resides, when the application tries to access such telephony services. That is to say a check is carried out that the application is in the memory area where only the manufacturer can place applications. Third party applications cannot be installed on this same area without breaking the phone. Third party applications will be therefore always located on different memory area.

Figure 3:
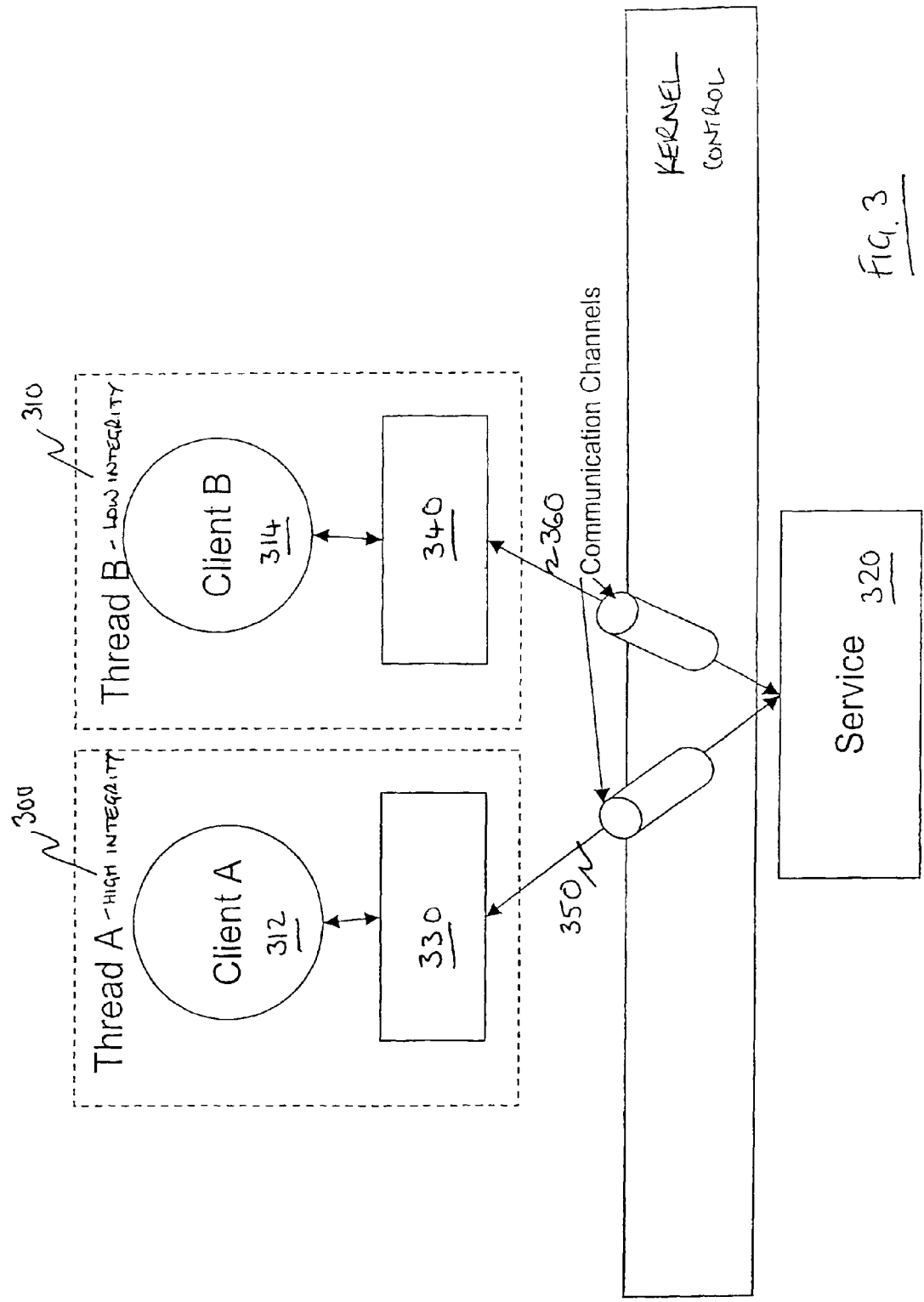
FIG. 3 illustrates data links between threads and a service provider.

FIG. 3 illustrates how embodiments of the present invention may operate to detect potential security risks. That is occasions when potentially malicious software attempts to access the CMT interface of the MS (100).

Figure 4:
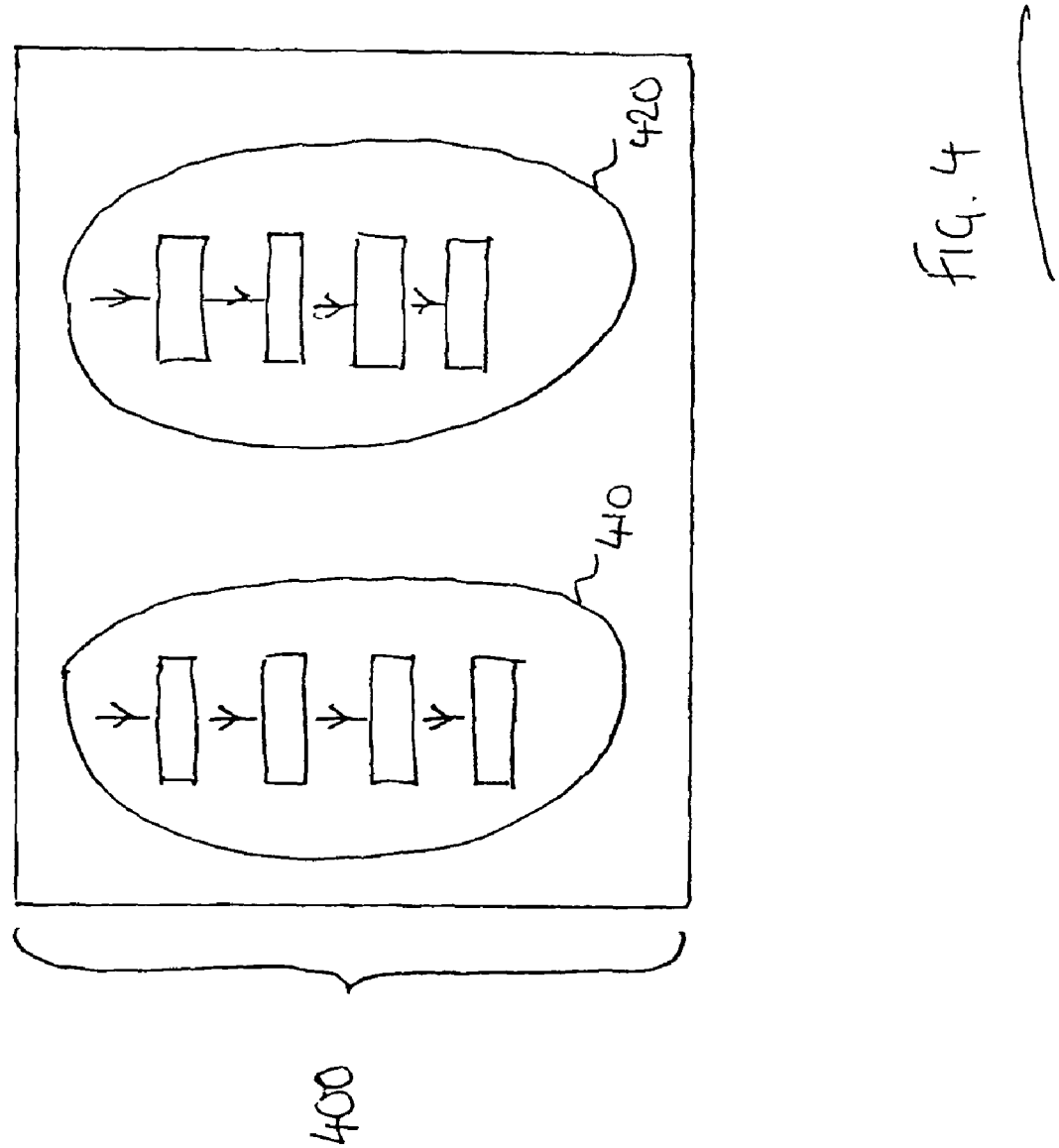
FIG. 4 illustrates an application running multiple threads.

As an application programme is run on a PDA processor of the MS (100) the programme has a beginning, an execution sequence and an end. However within the programme many "threads" may run. These are well known in the art of computing. A thread is similar to a sequence of a programme in the sense that a thread has a beginning, a sequence and an end. However a thread is not a programme, rather it is a single sequential flow of control within a programme. Multiple threads can run in a single application simultaneously and may perform different tasks. FIG. 4 illustrates a single program (400) running two threads (410, 420). The skilled man will understand that the term "lightweight process" is synonymous with a thread. The thread is considered lightweight because it runs within the context of the application and uses resources allocated to that programme.

In FIG. 3 two such threads 300 (thread A) and 310 (thread B) are illustrated. These threads are each associated with a respective client application (312, 314) respectively.

Box (320) illustrates the access to a service which the applications running threads A and B may wish to access. In this example the service required is obtained via the telephony services processor from the CMT interface of the MS (100). Such service is may, for example, be downloading an applet or image from a browser application or playing sound or animation concurrently.

In order to access these services a communication channel (or data link) is opened between each thread (to show in FIG. 3) and the service provider interface (or node) (320). The communication link provides a data-link via which data maybe transferred between the service provider node (320) and the client interfaces (330, 340) in threads (300, 310) respectively. In order for the services to be provided the data links (350, 360) must be established between thread A and the service provider (320) and thread B and the service provider (320).

In accordance with embodiments of the present invention when such a communication link is opened (such as when a request for a service is initiated) a check is made to establish if the client application running the respective thread is authorized to access the service it is trying to access. If the access is authorized the communication link is maintained. Thereafter the application may access services from the service provider node (320). If access is denied, as in the case of an application which has been loaded into the MS (100) and which may thus include a virus, an option is that the communication link may be dropped. As an alternative the link may be maintained but is flagged as being the source of a potential security risk and thereafter some action to maintain security may be taken to ensure that no breach of security occurs. Details of the application running the thread which is trying to obtain access to the CMT interface is obtained by investigating the call stack of the processor on which the application is run. Whenever a programme performs a function call, processor saves a copy of the caller's state information (including local variables and registers) in a block of data called a "stack frame" so that it can be restored when the called function returns. The stack frames are allocated in a region of memory called the "call stack". In this way the call stack contains information which can identify an application and/or thread being run in the MS (100). The type of the application can be extracted from this information in the call stack. One example of such identifying information is the memory area or address where the application resides as described above. The data links (350, 360) are set up under control of the kernel of the OS. No third party can access this portion of the MS (100) and thus the risk detection apparatus cannot be programmed around.

It is not essential that the application is identified. It is sufficient that only the applications memory address is checked to see if it is located in the area that only a manufacturer or other trustworthy party can program Responsive to this information a decision can be made as to whether access should be granted to the CMT services (or other services) or not.

At this stage the data link (350) is open and thereafter the thread may communicate via the data link with the service provider node (320).

Once the data link is open and a check has been carried out to see if the application is authorized a record is stored in the memory of the MS (this may not necessarily be in the ROM but may be in some other data store of the MS) which record includes an identifier of the thread which has established the data link. This thread identifier is unique to the thread and cannot be changed but is rather allocated by the kernel of the OS. Thereafter whenever the thread makes access to the service provider node via the data link it is not necessary to check from the call stack via kernel that the application is on the memory area where only the manufacturer can place applications. Rather it is merely necessary for a check to be carried out that the thread identifier associated with that thread has not been changed. If this is the case communication on the data link can be continued since a check that that application is authorized has already been carried out. Since the thread identifier cannot be changed other than in kernel this makes it very difficult for a programmer/hacker to programme around the security measure.

In alternative preferred embodiments a application memory location check is carried out each time the application software attempts to access the service.

In the case of an application being downloaded into the MS which contains malicious software such as shown by thread B in FIG. 3 (which is described as having a low integrity) the virus and/or Trojan horse or other malicious feature in the application will know how to access the service (for example the specific message structures and which portions of the MS should be used in order to send these messages to the CMT interface of the MS. This information would be obtainable to a skilled hacker or other entity wishing to introduce malicious subject matter into the MS (100)). In these circumstances the client application B requests a communication channel (data link) to be established between its own client interface (340) and the service provider node (320). Upon opening this channel a check is carried out to identify whether the memory address corresponding to the thread B application is located in allowed memory area (100). Since this application has been downloaded this will not be the case. As such the software is detected as being unauthorized.

As a result the communication channel is not opened. As an alternative the communication channel may be opened but some protective measures are simultaneously implemented as will be understood by those skilled in the art. For example only a safe subset of services are provided.

It will be understood that when implemented in the Symbian software platform embodiments of the present invention are implemented so that the interface to the CMT services is arranged through a specific device driver interface. Further embodiments of the present invention enable security checks to be added to the privileged side of a device driver interface in the MS directly. As such implementation of the present invention may be straightforward.

Embodiments of the present invention provide that the checking of the call stack should be made according to the physical addresses instead of virtual addresses. In addition the depth of the check should be configurable on a per channel basis. This enables a variable number of calls per channel to the verified as authorized to access services from that channel. In the cases where more than one interface exists between the call and the channel the address of the application software calling each interface is checked. This number may vary on a channel by channel basis.

It will also be understood that embodiments of the present invention provide that, on occasion, the identity of the client applications and the fact of whether or not they are authorized can be obviated. In these embodiments opened communication channels can be filtered for the type of messages being transmitted. Certain types of message indicating that, for example, no access to CMT facilities is required, can be considered safe and may be passed.

It will be understood that embodiments of the present invention provide a method of detecting and preventing security attacks towards the CMT interface of a high-end mobile phone. Thread identifiers and the processor call stack of a mobile phone are used to identify client applications attempting to use or using the CMT functionality from the PDA processor side of the MS (100). When a communication channel to the CMT processor is opened a client application thread identifier is stored in the security apparatus. After opening the channel a check is carried to see that the client application resides in the memory area where only the manufacturer can place applications. At every subsequent use of the communication channel a check is made that the thread identifier has not changed.

In alternative preferred embodiments an application memory location check is carried out each time application software attempts to access the service.

It will be understood by those skilled in the art that there are several alternative actions (or measures) which may be taken once it has been determined if a security risk exists according to the present invention. Such actions may be not responding, resetting the mobile station, or entering a separate "security violation mode" which could be used to highlight to a user of the mobile station that a security risk exists.

It will likewise be apparent to those skilled in the art that the present invention is not intended to be limited in scope to the details of the specific examples described hereinabove. Rather modifications could be made without departing from the scope of the present invention.

What is claimed is:

1. A method comprising:

determining at least one parameter associated with a communication link between an application running on user equipment and a node of said user equipment, wherein the user equipment is included in a communication system and the at least one parameter comprises a memory address representing a location in a data store of said user equipment where the application is stored; and detecting, at said user equipment, a condition in the communication system in response to said at least one parameter;

wherein said determining of said at least one parameter comprises determining, at said user equipment, if said application communicating with said node via the communication link is authorized to access a service provided at said node, wherein the application is authorized to access the service when the memory address of the application corresponds to a pre-selected storage area in the data store of the user equipment that includes applications placed in the pre-selected storage area only by a manufacturer of the user equipment or by other predetermined trustworthy sources, wherein only the applications in the pre-selected storage area are authorized to, when executed on the user equipment, establish communications links between the user equipment and the node, and wherein determination of the memory address of said application is performed by accessing memory address information for said application stored on a call stack of the user equipment;

subsequent to determining that the application is authorized to access the service, storing a thread identifier, associated with a lightweight process run by said application, in an entry associated with said communication link, said entry being held in the data store of the user equipment to indicate the that application is authorized to access the service;

subsequent to opening the communication link and storing a thread identifier, determining if the application is authorized to access the service by checking if the thread identifier associated with that communication link has been altered since a previous check; and determining that said client application is authorized to access the service from said service provides if said thread identifier has not altered.

2. The method of claim 1, wherein said data store compromises a read only memory data store in a mobile user equipment.

3. The method of claim 1, further comprising:

determining whether the application has been downloaded into said user equipment from a third party; and identifying that said application is not authorized to access a service from the node if it is determined that a client application has been so downloaded.

4. The method of claim 3, further comprising:

when an application requires access to a service, opening a communication link via which said client application may access a service from a service provider node offering that service; and detecting from a call stack of a processor running said application, a memory address, identifying where said application resides, for indicating that the client application is authorized to access that service.

5. The method of claim 1, wherein said at least one parameter comprises a message type indicating a type of service to which access is requested by the application, said method further comprising:

determining whether said message type is of a type which is predetermined as safe and if so determining that no security risk exists.

6. The method of claim 5, wherein said determining a safe message type comprises comparing said message type with a predetermined list of safe message types.

7. The method claim 5, further comprising:
if said message type is determined to be not safe, determining at least one parameter associated with a communication link between an application and a node of said user terminal; and
detecting said condition in response to said at least one parameter.

8. The method of claim 1, further comprising:
initiating at least one security measure if said condition is identified.

9. The method of claim 1, wherein said condition comprises whether said application is authorized to access a service from said node.

10. The method of claim 1, wherein said condition comprises a security risk.

11. The method of claim 1, wherein said communication system is a wireless communication system and said user equipment is mobile user equipment.

12. The method of claim 1, wherein said communication link comprises a data link and said node comprises a service provider node.

13. An apparatus comprising:
at least one processor;
at least one memory, the processor and memory configure to provide a process comprising:
determining at least one parameter associated with a communication link between an application running on user equipment and a node of said user equipment, wherein the user equipment is included in a communication system and the at least one parameter comprises a memory address representing a location in a data store of said user equipment where the application is stored; and
detecting, at said user equipment, a condition in the communication system in response to said at least one parameter;
wherein said determining of said at least one parameter comprises determining, at said user equipment, if said application communicating with said node via the communication link is authorized to access a service provided at said node, wherein the application is authorized to access the service when the memory address of the application corresponds to a pre-selected storage area in the data store of the user equipment that includes applications placed in the pre-selected storage area only by a manufacturer of the user equipment or by other predetermined trustworthy sources, wherein only the applications in the pre-selected storage area are authorized to, when executed on the user equipment, establish communications links between the user equipment and the node, and wherein determination of the memory address of said application is performed by accessing memory address information for said application stored on a call stack of the user equipment;
subsequent to determining that the application is authorized to access the service, storing a thread identifier, associated with a lightweight process run by said application, in an entry associated with said communication link, said entry being held in the data store of the user equipment to indicate the that application is authorized to access the service;
subsequent to opening the communication link and storing a thread identifier, determining if the application is authorized to access the service by checking if the thread identifier associated with that communication link has been altered since a previous check; and
determining that said client application is authorized to access the service from said service provides if said thread identifier has not altered.

14. The apparatus of claim 13, wherein the process further comprises:
determining whether the application has been downloaded into said user equipment from a third party; and
identifying that the application is not authorized to access the service from the node if it is determined that the application has been so downloaded.

15. The apparatus of claim 13, wherein said at least one parameter
comprises a message type indicating a type of service to which access is requested by the application, the process further comprising:
determining whether said message type is of a type which is predetermined as safe and if so determining that no security risk exists.

* * * * *